No. 680,413. Patented Aug. 13, 1901.
F. B. HAYDEN.
LAMP.
(Application filed Apr. 16, 1901.)
(No Model.)
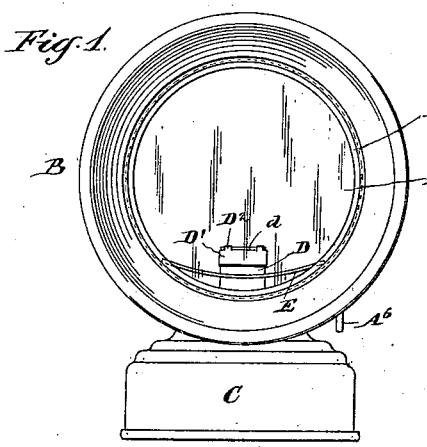
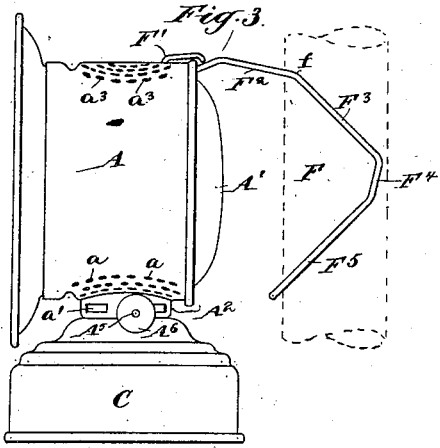
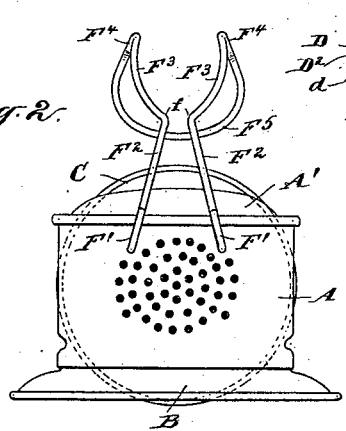
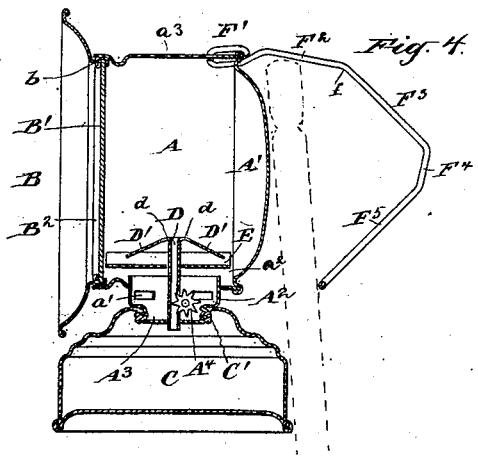
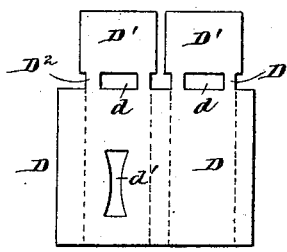
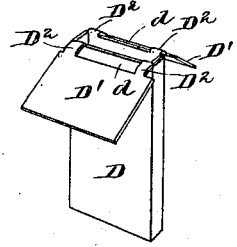
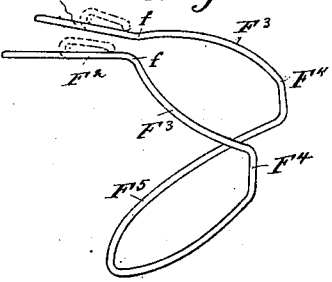
Witnesses:
Inventor:
Frederick B. Hayden,
by his attorney,
Charles R. Searle.
THE NORRIS PETERS CO., PHOTO-LITHO., WASHINGTON, D. C.

UNITED STATES PATENT OFFICE.

FREDERICK B. HAYDEN, OF BELLEVILLE, NEW JERSEY, ASSIGNOR TO WILLIAM R. NOE, OF EAST ORANGE, NEW JERSEY.

LAMP.

SPECIFICATION forming part of Letters Patent No. 680,413, dated August 13, 1901.

Application filed April 16, 1901. Serial No. 56,035. (No model.)

*To all whom it may concern:*

Be it known that I, FREDERICK B. HAYDEN, a citizen of the United States, residing in Belleville, in the county of Essex and State of New Jersey, have invented a certain new and useful Improvement in Lamps, of which the following is a specification.

The invention relates more particularly to small lamps or lanterns burning kerosene and intended to serve as bicycle or carriage lamps.

The object of the invention is to provide a construction which shall be extremely simple, of few parts, mainly stamped and shaped by suitable dies, easily assembled with but little handwork, and therefore eminently inexpensive to manufacture, and also so proportioned and equipped that satisfactory illumination is attained and the lamp easily attached to and removed from the bicycle or other vehicle with which it is to serve.

The invention consists in a novel construction of wick-tube and air-deflectors and shield therefor, and in means for carrying the lamp and for supporting it upon the vehicle, and also in certain details of construction and arrangement of parts to be hereinafter described.

The accompanying drawings form a part of this specification and show the invention as I have carried it out.

Figure 1 is a front elevation of the lamp complete. Fig. 2 is a plan or top view of the same. Fig. 3 is a side elevation, and Fig. 4 is a substantially central vertical section through Fig. 1. Fig. 5 is a top view of the wick-tube alone, and Fig. 6 is a perspective view of the same. Fig. 7 is a face view of the blank from which the wick-tube is formed. Fig. 8 is a perspective view of the supporting means alone.

Similar letters of reference indicate the same parts in all the figures.

A is the body of the lamp, B the removable front matching thereto, and C is the oil-fount. All are sheet metal, preferably tinned sheet-iron, stamped or spun to the forms shown and having the joints seamed to avoid the expense of soldering as far as practicable. The rear of the body is closed by a concave disk A', serving as a reflector, and the open end opposite receives the front B, matching snugly within the body and held by friction alone. The front contains a circular disk B', of glass, held in place by an open wire ring B², matching in a groove $b$. On the under side of the body and projecting within the latter is soldered an open-top tube A², drawn together and closed below to form the screw-threaded neck A³, matching the collar C' on the oil-fount C and joining the latter to the body. Within the tube A² and extending through the collar is the wick-tube D, soldered in place and reaching upward to the required height within the body A. It is provided with a wick-raising ratchet A⁴, operated, as usual, by a shaft A⁵ and button A⁶ and engages the wick through the slot $d'$. The wick-tube passes through and holds in position a curved deflecting-plate E, lying loosely within the lamp-body, as shown, and at the upper end is provided with the wings D' D', having the openings $d\ d$, serving the usual function of protecting the flame and properly presenting the air-currents thereto. The plate E is held against upward movement by the wings D' and against displacement laterally by the body of the wick-tube.

The construction of the wick-tube is peculiar. It is struck from sheet metal in a single plane piece in the form shown in Fig. 7, and comprises the body portion D, having the wings D' D' thereon joined to the body portion by the narrow connecting portions D² D², and is shaped by bending or folding at right angles on the dotted lines in that figure, thus forming a flat rectangular tube, with the wings D' D' extending from one end and lying parallel to each other in the planes of the two flat faces of the tube. Thus conditioned it is soldered in the opening in the bottom of the tube A², with the wings projecting into the lamp-body. The plate E is then applied over the wings and allowed to find its place in the lower portion of the lamp-body, and is then locked in place by the bending down of the wings to the required angle for service. The bending is easily performed by the fingers, because of weakness of the portions D² D², due to the removal of portions of the metal to form the slots or openings $d\ d$.

Air to supply combustion enters through the perforations $a\ a$ in the body and $a'\ a'$ around the tube $A^2$ below the loosely-fitting plate E, and passes at the considerable opening $a^2$ in rear thereof and also around the other edges of the plate.

At the top of the body is a group of perforations $a^3\ a^3$, through which the products of combustion escape.

F is a peculiarly-formed frame or bracket bent from a single length of wire to the shape shown. It is attached to the upper portion of the body by the loops $F'\ F'$, extending through separated openings in the rear face near the top and firmly grasping the angle formed by the junction of the reflector $A'$ with the body. Thence the arms $F^2\ F^2$ extend rearwardly and convergently to the bends $f f$, where they again separate on downwardly-inclined curves $F^3 F^3$ to short straight stiffening portions $F^4\ F^4$, from which both branches join in the downwardly and forwardly inclined loop or bight $F^5$. The stiffness of the connection to the body may be insured by applying a drop of solder to each of the loops $F'\ F'$. The frame F thus formed serves as a convenient handle by which to carry the lamp in the hand. By spreading the curves $F^3\ F^3$ they will securely grasp a cylindrical support of suitable dimensions, as a bicycle-head, (see Fig. 3,) or the loop $F^5$ may be forced rearwardly to engage the dashboard or seat-back of a vehicle between itself and the lamp-body and fount, as indicated in the dotted lines in Fig. 4. The several portions contribute mutually to the stiffness of the spring-frame, but allow it to yield sufficiently to afford a reliable grasp in supporting the lamp.

The material of which the several parts of the lamp are formed and the sizes and proportions may be varied. Parts may be used without the whole, the wick-tube may be used with other forms of burners, and the frame F may serve in other situations.

In the construction shown the admission of air to the flame and the protection afforded to the latter by the deflecting-plate E and the wings $D'\ D'$, although extremely simple, are very efficient, and in practical use the flame is successfully maintained in high winds and under the conditions of sudden shocks, to which bicycle and carriage lamps are peculiarly subjected when in service.

I claim—

1. In a lamp the wick-tube described consisting of a single piece of sheet metal and comprising the body portion D, the wings $D'\ D'$ provided with openings $d\ d$ at their line of junction with the body portion and easily-bent portions $D^2\ D^2$ connecting the former to the latter and upon opposite sides of the openings $d\ d$, all substantially as herein specified.

2. In a lamp, the body A and tube $A^2$, the wick-tube D and its wings $D'\ D'$ formed integral therewith, joined to said tube $A^2$, the plate E lying within said body and held in position relatively thereto by said wick-tube, and locked against removal by said wings, the latter being bent downward toward said plate after the latter has been placed in position, all combined and arranged to serve substantially as herein specified.

3. In combination with a lamp of the character set forth, a supporting-frame comprising the loops $F'\ F'$, converging arms $F^2\ F^2$, outwardly and downwardly curved portions $F^3\ F^3$, downwardly-projecting straight portions $F^4\ F^4$ and downwardly and inwardly projecting bight $F^5$, adapted to serve as a handle and in attaching the lamp to a bicycle-head or to a dashboard or analogous objects, all substantially as herein specified.

In testimony that I claim the invention above set forth I affix my signature in presence of two witnesses.

FREDERICK B. HAYDEN.

Witnesses:
ROBT. CONNOR,
CHARLES R. SEARLE.